No. 622,669. Patented Apr. 11, 1899.
T. C. DRAKE.
BATTERY CUT-OUT FOR ELECTRIC SELECTOR SYSTEMS.
(Application filed Feb. 17, 1898.)
(No Model.)
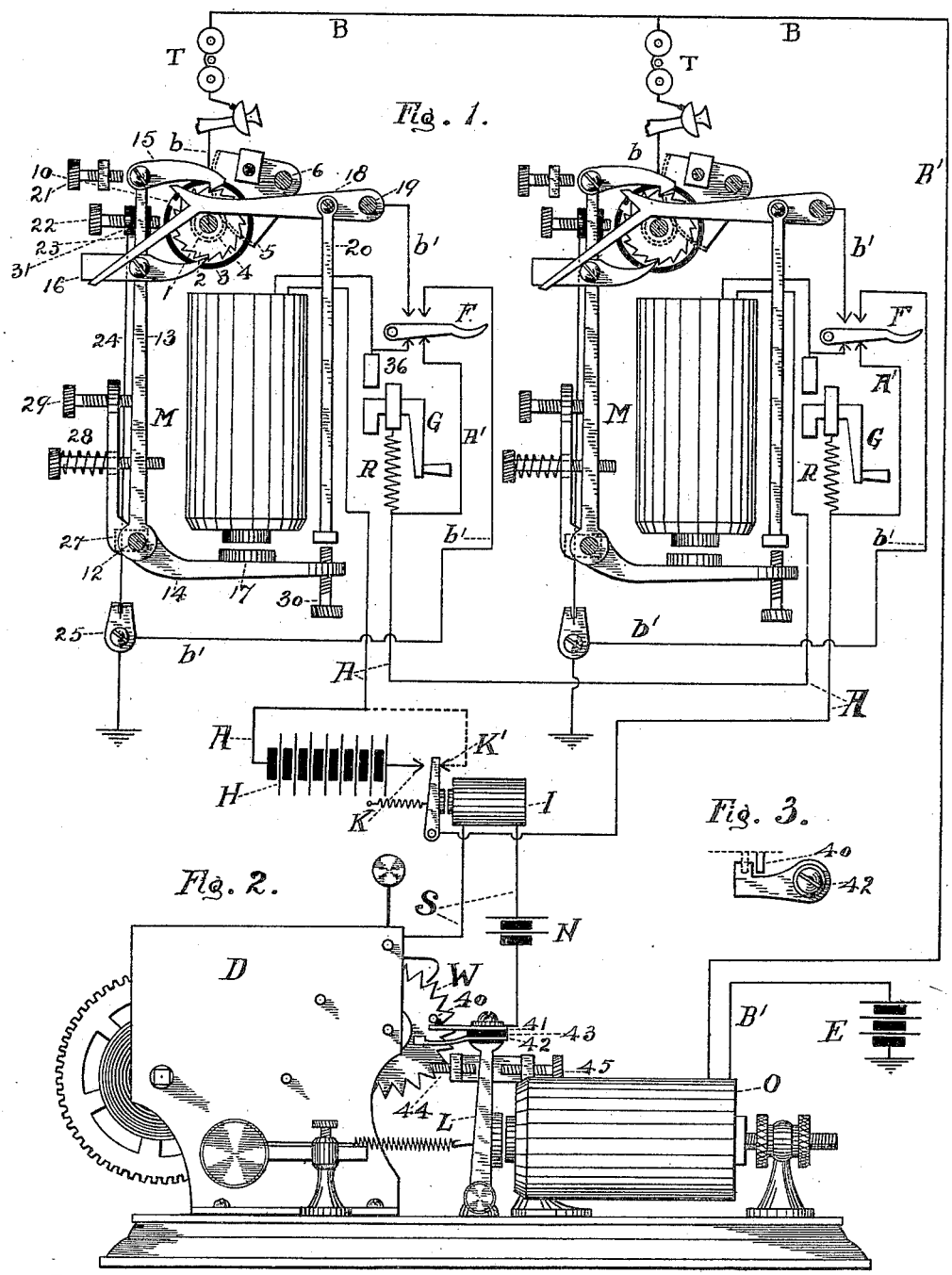
Witnesses.
John D. Erwin
Geo. W. Scott
Inventor.
Thomas C. Drake

UNITED STATES PATENT OFFICE.

THOMAS C. DRAKE, OF MALTA, OHIO.

BATTERY CUT-OUT FOR ELECTRIC SELECTOR SYSTEMS.

SPECIFICATION forming part of Letters Patent No. 622,669, dated April 11, 1899.

Application filed February 17, 1898. Serial No. 670,654. (No model.)

*To all whom it may concern:*

Be it known that I, THOMAS C. DRAKE, a citizen of the United States, residing at Malta, in the county of Morgan and State of Ohio, have invented a new and useful Improvement in Battery Cut-Outs for Electric Selector Systems, of which the following is a specification.

My invention relates to battery cut-outs for cutting out the operating-battery of electric selector systems, which heretofore required the battery to remain continuously in the circuit.

Usually series lines of step-by-step mechanism are so constructed and operated that any station on the line may call a selected station, which obviously requires the line to remain normally closed, and consequently a battery must be employed which is capable of discharging current through the circuit continuously whether the system is in actual use or not.

The characteristics of closed-circuit batteries are well understood in the art. They are expensive to maintain, require more or less attention frequently, and it is practically impossible to maintain a current through a circuit for any length of time without fluctuations and variations that interfere with the operation of the system. All selector systems or mechanisms constructed for similar purposes require a practically constant current if satisfactory and commercial results are to be attained. In the main the lack of suitable batteries or a means to overcome their objectionable and impracticable features has been the obstacle to impede the progress in electric selector step-by-step systems as applied to the operation of small telephone-exchanges in towns and villages not now supplied with that recognized necessity.

Closed-circuit batteries as sold in the market at the present time will not remain constant in electromotive force and discharge of current for any length of time and for this reason alone are not a thoroughly practical means to operate a series of mechanisms that are adjusted and intended to work in unison with a definite strength of current.

It is well known in the art that the commercial forms of open-circuit batteries will remain practically constant in electromotive force and discharge of current if the current is used only intermittently or at intervals of a few minutes at a time. This is particularly the case with the Leclanché cell and its modifications, the dry battery of the commercial form, and several of the "universal" or cells intended and sold for both open and closed circuit work.

Heretofore in all systems of the selector variety or those working on the step-by-step plan, in which any station can call a selected station without disturbing those not wanted, and also operating without the intervention of a central office or manual means to place the battery on the line at the instant it is desired to make a call, a closed-circuit type of battery has been found necessary to operate the selector-line or step-by-step circuit. This is especially the case in my systems described in Patents Nos. 599,322, 605,309, and 605,688, and also in many other systems that have been patented prior to the above. All these systems are alike in this one particular and also are all systems intended to be worked after this mode. The invention pertaining to battery cut-outs herein described and claimed is applicable to all such systems and readily makes possible the application of open-circuit batteries to closed-circuit systems, thus giving a practically constant current at all times with none of the troubles attending closed-circuit batteries. Long life and a greatly-diminished cost in maintenance are results also attained by the use of open-circuit cells.

In all of the patents designated in the foregoing there is a peculiarity existing in that the current for operating the mechanism must remain on the line for a few seconds after the circuit has been closed and the system actually thrown out of operation. This is necessary for the reason that the electromagnetic action of the mechanism must remain energized for a short while after the circuit has been closed in order to allow time for the mechanisms to reset themselves or time for the retrograde movement of the revolving parts to resume normal or starting position. Therefore a battery cut-out must be so constructed as to cut the battery out of circuit subsequently to the closing of the circuit or not until the series of mechanisms have resumed or reset themselves to normal position.

In the accompanying drawings the cut-out mechanism is diagrammatically represented in connection with two selector step-by-step and restoring mechanisms of a commercial form, and its construction and operation will be described in connection with this mechanism and system throughout the subsequent part of this specification, with the exception of the latter part, wherein will be described its applicability to other forms of mechanisms and systems.

It must be understood that the step-by-step mechanisms are located at the various stations throughout a party telephone-line or a selective signaling-circuit, and that each station may operate the system to selectively call the other stations, and that the battery-cut-out mechanism and the battery for operating the series of step-by-step mechanisms hereinafter referred to may be located at any convenient point along the circuit.

Figure 1 is an elevation of the step-by-step and restoring mechanism; Fig. 2, an elevation of the cut-out mechanism, and Fig. 3 a top plan view showing the shape of a stop-catch hereinafter fully described.

In this system two line-wires are usually and preferably employed in its operation, one over which conversation and signaling are carried on and the other over which the selector mechanisms are operated in series and in such a manner as to ground "legs" from the talking and signaling circuit through selected signal-bells.

Throughout this specification reference to the "selector-circuit," which is designated A, will be understood as the circuit operating the step-by-step and restoring mechanisms in series, and the circuits designated B, B', b, and b' will be understood as the "signaling-circuit," which contains the signaling and talking apparatus and other devices which are to be described in detail. The circuit B' will be also referred to hereinafter, and especially in the annexed claims, as a "supplemental" circuit.

The circuit A is diagrammed as "metallic" and the circuit B and B' with "ground-return," so as to be easily distinguished in the description of the system. However, both circuits may have ground-return or metallic or they may have one wire as a return for both.

In Fig. 1, M represents electromagnets for oscillating the levers 13 and 14, which in turn steps the ratchet-wheel 2, and consequently the contact-disk 3. The electromagnets are connected in series in the selector-circuit A with the operating-battery H. In this circuit are also contact-cranks G for pulsating the current and switches F for keeping the circuit normally closed at each station.

R represents resistances located at each station and under the control of the switches in such a manner as to be cut out of circuit when the switches are "down" and to be cut in the circuit when the switches are "released." Circuit A' serves as a shunt-circuit for the resistance and contact crank by reason of the switch F closing it between the contact-leaf 36 and the lower terminal of the resistance. The function of the resistance R is by its introduction into the circuit A to increase the resistance of that circuit, thereby diminishing the normal strength of current flowing through it. The station mechanisms, Fig. 1, as will be described farther on, are so constructed that by passing a current of given strength intermittently through the electromagnets M a step-by-step movement is imparted to the ratchet-wheel and contact-disk, and by passing a current of greater strength through the same electromagnets the mechanism will operate to reset the ratchet-wheel and contact-disk to normal or starting position. To more clearly understand the practical working of the mechanism, suppose that in the circuit A fifteen milliamperes of current constitutes the normal current and that on introducing the resistance R the normal current will be diminished to ten milliamperes. The ten milliamperes on being passed through the circuit intermittently by revolving a contact-crank will operate the step-by-step mechanism, and the normal or fifteen milliamperes on being restored in the circuit by cutting out the resistance will operate the mechanism to reset the revolving parts to normal or starting position. In this manner a series of mechanisms may be stepped to a predetermined position by cutting in the resistance at any station and revolving the contact-crank to pulsate the current and reset to normal or starting position on cutting out the resistance to restore the normal current.

The step-by-step and restoring mechanisms are constructed as follows: Mounted on an arbor 1 is a ratchet-wheel 2, containing as many or more teeth than there are instruments in the system; also, a contact-disk 3, constructed by placing a band or rim of insulating material around the periphery of a metallic disk. A contact 10 passes through the insulating-band and forms a metallic contact-segment on the periphery of the disk. A pinion-gear 4, (represented by the dotted circles,) meshing with the weighted segment-gear 5, serves to return the ratchet and contact-disk to normal position by reason of the retrograde motion given to the arbor 1 by the weighted segment-gear on the disengagements of the pawls 15 and 16, as will be hereinafter more fully explained. The arbor 12 carries two levers 13 and 14, the former being vertical, and carries at its upper end two pawls 15 and 16, by means of which a step-by-step movement is imparted to the ratchet-wheel and contact-disk, and the latter being angular and having a bearing on said arbor 12 independent of the lever 13 and arranged in such a manner as to move independent of lever 13 when the stress-spring 28 is overcome. By means of stress-spring 28 and adjusting-screw 29 the vertical arm of angle-lever 14 is so united to the vertical lever 13 that they oscillate together under the electromagnetic strength of the diminished intermittent current while giving a step by step to the ratchet-wheel, but separate under the electromagnetic strength of the normal current, which overcomes the stress-spring, thereby giving an independent or distinct movement to the said angle-lever 14. The independent or distinct movement thus imparted to the angle-lever acts to disengage the pawls from the teeth of the ratchet in the following manner: While the levers are oscillated by the electromagnets under the influence of the diminished intermittent current to step the ratchet-wheel, the bifurcated lever 18, which is pivoted on an arbor 19, is not influenced or operated thereby; but the higher or normal current on being passed through the electromagnets will overcome the stress-spring 28, thereby disengaging the pawls 15 and 16 by reason of the adjusting-screw 30 transmitting the independent or distinct movement of lever 14 to the lifting-rod 20.

It is obvious that the stress-spring 28 must be adjusted to be sensitive to the different strengths of current which are passed through the electromagnets and that to give a step by step to the mechanism requires the normal current to be restored, thus overcoming the stress-spring and disengaging the pawls, which allows a retrograde motion of the revolving parts, which resets the mechanism to normal or starting position.

In the manufacture of the commercial mechanisms it has been found that by constructing the lever 13 out of a certain thickness of metal no stress-spring is required, as the lever itself has elasticity and possesses the stiffness and tension necessary to distinguish between the diminished and normal currents. However, the two adjusting-screws 28 and 29 are substantially employed, as shown, as a means to adjust the electromagnetic action of the mechanism.

The contact-disk 3, containing the contact-segment 10, which is adapted to make contact with the contact-screw 22 at a certain predetermined position of rotation of arbor 1, is adjustably mounted on said arbor between the ratchet 2 and the pinion-gear 4. As the series of mechanisms operate simultaneous in all their operations, it is obvious that the contact-disks at the various stations may be set to close the signaling-circuit at any predetermined position—i. e., one may close the signaling-circuit at the first step of the system, another at the second step, and so on throughout the entire series of mechanisms.

Limiting and adjusting screws 21 and 22 are to adjust the pawls to the ratchet and to limit the movement of lever 13. The former limits the outward movement and the latter forms a contact-point for the segment-contact 10 and adjusts the return movement by coming in contact with the periphery of the contact-disk. The contact-screw 22 is insulated from the lever 13 by insulating-bushing 23 and has electrical connection with the retractile-spring adjustment 25 by means of retractile spring 24, which is also insulated from the arbor 12 by a rectangular block of insulating material 27. The wire 24 is of suitable material to act as a retractile spring for the levers and also as an electrical conductor between the contact-screw 22 and the grounded spring adjustment 25.

As before stated, the circuit A is a series circuit. It contains the electromagnets for operating the step-by-step and restoring mechanisms, the operating-battery H for energizing the electromagnets, the contact cranks and resistances for pulsating and diminishing the current, and the switches F, by means of which the contact cranks and resistances are normally cut out of circuit.

The talking and ringing circuit B, before mentioned, is "legged" to each selector step-by-step mechanism by leg $b$, which contains the talking and ringing apparatus T, shown in conventional symbols. This is an open multiple circuit—i. e., it is connected in multiple to the ground at each station and the ground connection is normally open or broken. By means of circuit $b'$ the circuit B may be grounded or closed through T on releasing the switches F, which are arranged to open the circuit A' and close the circuit $b'$ at the will of the operators. By means of the contact-disk 3, which is permanently connected to $b$, and the contact-screws 22, which are permanently grounded at 25, the talking-circuit B may also be closed through T at any selected station by operating the line A to step the contact-disks into position to close the circuit $b$ to the grounded retractile spring 24. The object in grounding or closing the talking-circuit B through $b'$ to 25 by the switch F is to close the line B through the cut-out magnets O and at the same time place the ringing and talking apparatus T at that station on the line B, so as to signal and converse with the other stations when the step-by-step mechanisms have been operated to ground the talking-line through the selected contact 22 and its corresponding ringing and talking apparatus T.

It is obvious from the connection of the circuit B that a ringing and talking circuit may be established between any two of a series of stations by releasing the switch at the station desiring to make a call and operating the selector step-by-step circuit by revolving the contact-cranks to throw in the second or station desired to be called. It is also obvious that the line B is normally open at all stations, that it is only closed while ringing or talking, and that only one station can be rung at a time by reason of the contacts 10 being set at dissimilar positions in respect to the normal or starting position of the system.

The signaling and talking circuit B is permanently grounded through a high-resistance and high-impedance electromagnet O by means of circuit B'. In this circuit is also a battery E for energizing the magnet O when any one of the switches is released to ground the circuit B. The electromagnet O controls the mechanism which cuts the battery H out of circuit A subsequent to the closing of the step-by-step circuit, as will be hereinafter fully explained.

The battery cut-out is preferably constructed as follows: The high-resistance and high-impedance magnets O hereinbefore referred to are mounted on a suitable base similar to the commercial forms of relays. In fact, the construction of the cut-out, with the exception of the clockwork hereinafter described, is modeled after the approved forms of relays now in general use on lines of telegraph. The clockwork D is of the ordinary construction and is also mounted on the base with the electromagnets. An escape-wheel W is arranged with retarding-pallet, which allows the escape-wheel to revolve a complete revolution in about three seconds. It, however, does not revolve until released through a movement of the armature-lever L, the action of which will be fully explained. The armature-lever is furnished with the usual armature, retractile spring, and adjusting-screws 44 and 45. The escape-wheel is arranged with a protuberating stop-pin 40, the purpose of which is to stop the rotation of the clockwork and to close the circuit S when the magnet O is not energized and the lever L stands against adjusting-screw 44. The upper end of lever L is arranged with stop-catches 41 and 42, the former being in electrical connection with one terminal of circuit S and the latter insulated at 43 from it. The clockwork, of which the stop-pin is electrically a part, is also permanently connected with the other terminal, so that when the pin rests on the stop-catch 41 the circuit will be closed through the relay I, and when resting on stop-catch 42 the said circuit will remain open. The lever L when standing in normal position is at rest against adjusting-screw 44, and when in an energized position is at rest against screw 45. The stop-catches are constructed to allow the escape-wheel to revolve one complete revolution each time the lever is attracted by the magnet and retracted by the spring. Its operation is as follows: The stop-catch 41 is made shorter than 42 and catches the pin when the armature-lever is at rest against screw 44. The stop-catch 42 catches the pin when the lever is attracted to screw 45, but releases it by reason of the notch, which allows the pin to pass through when the lever again resumes position against screw 44. The shape of the stop-catch 42 is shown in Fig. 3. The stop 42 catches the pin 40 when the lever L is in an energized position and holds the escape-wheel as long as the magnet O remains energized by reason of the signaling-line B being grounded. Consequently the relay I remains open as the stop-catch 42 is insulated from the circuit S.

On opening the line B the armature-lever L is retracted to screw 44. The pin 40 escapes the catch 42 and revolves on around to stop on catch 41, requiring about three seconds, during which time the circuit S still remains open, and consequently the battery H, cut in the selector-circuit. The relay I acts as a circuit-breaker for the selector step-by-step circuit A. This circuit is connected in the "local," and the circuit S is connected in the "main." When the contact stop-pin 40 rests on the stop-catch 41, the relay is energized, consequently interrupting the circuit A at the point K, which will leave the battery H on open circuit. If the relay is constructed with back and front contacts K and K', a circuit shown by the dotted lines connecting at K' may be employed to keep the circuit A normally closed without the battery being in it. This, however, is not necessary in the practical operation of the system. It is obvious that the relay will keep the battery cut out while the stop-pin remains in electrical contact with the stop-catch 41 and that the battery will be cut in while the stop-pin is out of contact with the said catch. Therefore when any one of the switches F is released the electromagnet O is energized and the circuit S broken, whereupon the battery is cut in the line A, so as to energize the selector step-by-step mechanism on revolving the contact-crank corresponding to the above released switch. When the switches F are again placed down, which is their normal position, the line B is opened and the magnet O is no longer energized. The armature-lever L resumes position with screw 44. The pin 40 is released by catch 42, and the escape-wheel must revolve a complete revolution before the battery can be cut out of circuit A. During this time, which is about three seconds, but may be made greater or less, as desired, the pawls 15 and 16 of the step mechanism have been disengaged from the ratchet-wheel, and a retrograde movement has taken place by means of the weighted segment-gear 5, which resets the mechanism to starting position. After the pin revolves into contact with the catch 41 the battery H is cut out and the pawls are no longer disengaged, as there is no battery in the circuit to energize the magnets M. It is obvious that the time required by the wheel W in making a revolution after being released is the time which the battery remains on the line A after the switches are down and that the selector mechanisms are supposed to reset in that time.

The operation of the system is as follows: To effect a call from any station to a selected station, the switch F is released, which opens the shunt-circuit A' and closes the leg b and b' to ground through the ringing and talking apparatus T. The resistance R is now in the step-by-step circuit A, and the cut-out mechanism has effected the following operations in order to cut the battery H into the step-by-step line: The armature-lever L on being attracted to screw 45, the circuit S is broken at the stop-pin 40. The relay I is no longer energized. Therefore the circuit A is closed at the point K. On revolving the contact-crank G the normal current, which is diminished by reason of the resistance being in series with it, is intermittently passed through the electromagnets M, which in turn steps the contact-disks simultaneous at all stations throughout the system. As the contact-disks are set to close the circuit b at but one instrument at a time, it is obvious that the circuit B is only grounded through the ringing and talking apparatus of but two stations at any one operation of the system. At the completion of a call or conversation the switches F are returned to their normal position, which is down, whereupon the following operations take place in order to restore the station mechanism and cut out the operating-battery: The signaling-circuit B is opened, and the shunt-circuit A' is closed, which cuts out the resistance and restores the normal current. The escape-wheel W has been released by reason of the magnet O being no longer energized and revolves on around to catch on stop-catch 41, whereupon the circuit S is again closed and the battery H cut out. Subsequently to closing the switches and restoring the normal current the pawls 15 and 16 of the step-by-step mechanism were disengaged and remained so while the escape-wheel W was making a complete revolution. This, as hereinbefore pointed out, is necessary for the reason that the resetting of the mechanisms to normal position requires a short time, in which the retrograde movement must fully return each and every one to starting position.

The resistance-relay described in my Patent No. 605,688, by means of which the resistances at each station are dispensed with, may also be incorporated into the cut-out mechanism or circuit B' and the normal current thereby diminished in the same way as described in that application.

Besides the mechanisms described in my three patents hereinbefore referred to the cut-out is equally well adapted to other forms of step-by-step mechanisms—such, for instance, as those described in Patents No. 237,576, dated February 8, 1881, Miller, calls, step by step; No. 563,084, dated June 30, 1896, Smith, selective calls, step by step, both of which from the description given in the specifications might be operated on a series line after my mode if they have been perfected and reduced to a practical apparatus.

What I claim as my invention, and desire to secure by Letters Patent, is—

1. The combination with a selective step-by-step system, of a battery-controlling mechanism adapted to cut in the operating-battery of the said system at the instant of operating the system, and cut out the said battery subsequent to the operation thereof, the said mechanism consisting of electromagnetically-controlled circuit making and breaking contacts which are impelled and retarded by suitable means and adapted to cut in and cut out the said operating-battery through the instrumentality of a supplemental relay, respectively, as the impelled and retarded contacts are opened and closed by the stop-catches, substantially as described.

2. The combination with a signaling system, of a battery-controlling mechanism adapted to cut in the operating-battery of the system at the instant of operating the system, and cut out the said battery subsequent to the said operation thereof, the said mechanism consisting of an impelled and retarded escape-wheel, means to impel the escape-wheel, electrical contacts carried by said escape-wheel, an electromagnetically-controlled lever, a stop-catch carried by said lever and adapted to stop the escape-wheel and make electrical connection therewith when the said lever is in the retracted position, a stop-catch electrically insulated from the first-mentioned stop-catch and adapted to stop the said escape-wheel and break electrical connection therewith when the said lever is in the attracted position, substantially as described.

3. In a selector system, the combination of a series of step-by-step and restoring mechanisms at a series of stations respectively, an energizing-battery or source of current connected with the said series of mechanisms to operate the same, a cut-out mechanism connected in a supplemental circuit and operating to cut out the said energizing-battery or source of operating-current subsequent to the restoring of the series of mechanisms therein, the said cut-out mechanism being operated by means of a current established in the said supplemental circuit, on closing the same at any one or more stations in the system, substantially as herein set forth.

4. In a series of step-by-step and restoring mechanisms in which the normal current synchronously operates the restoring mechanisms, and a pulsating diminished current synchronously operates the step-by-step mechanism, the combination of the selector-circuit containing the step-by-step and restoring mechanisms in series with an energizing-battery, means to cut out the energizing-battery subsequent to each operation and restoration of the mechanisms therein, said means consisting of circuit making and breaking mechanism electrically operated in a supplemental circuit in such a manner as to place the said battery in the selector-circuit at the instant it is desired to operate the system, and cut out the said battery subsequent to the restoring of the mechanisms therein, substantially as described.

5. In a series of step-by-step and restoring mechanisms in which the normal current synchronously operates the restoring mechanisms, and a pulsating diminished current synchronously operates the step-by-step mechanisms, the combination of the selector-circuit containing the step-by-step and restoring mechanisms in series with an energizing-battery, a supplemental circuit adapted to be closed and opened at each selector mechanism by suitable switches, a battery cut-out located in a permanently-closed branch or leg with an energizing-battery, the said battery cut-out adapted to place the first said energizing-battery in the selector-circuit at the instant of closing the said supplemental circuit through the said cut-out mechanism, and cut out the first said battery subsequently to the opening of the said supplemental circuit, substantially as described.

6. In a battery-cut-out mechanism, the combination of an electromagnet to energize an armature-lever, the said armature-lever adapted to release and stop an impelled and retarded escape-wheel, means to impel the escape-wheel, a stop-catch carried by said armature-lever to stop the escape-wheel and make electrical connection therewith when the said armature-lever remains in normal position, a stop-catch electrically insulated from the first said stop-catch and adapted to stop the said escape-wheel and break electrical connection therewith when the said armature-lever is in an energized position, all for the purpose set forth.

7. The combination in a battery-cut-out mechanism for cutting out the energizing-current of electric selector systems subsequent to the restoring of the mechanisms therein, of the relay adapted to interrupt the said energizing-battery, an impelled and retarded escape-wheel carrying a contact stop-pin, an armature-lever adapted to release and stop the said escape-wheel in either the attracted or retracted position of the said lever, a stop-catch carried by the said armature-lever and adapted to stop the said escape-wheel and close the said relay when the armature is in an attracted position, a stop-catch electrically insulated from the first said stop-catch and adapted to stop the escape-wheel and open the said relay when the armature is in a retracted position, substantially as described.

8. The combination in a battery-cut-out mechanism for cutting out the energizing-current of electric selector systems subsequent to the restoring of the mechanisms therein, of the relay adapted to interrupt the said current, an impelled and retarded escape-wheel carrying a contact stop-pin, an armature-lever adapted to release and stop the said escape-wheel in either the attracted or retracted position of the same, a stop-catch carried by said armature-lever and adapted to stop the said escape-wheel and close a local battery through said relay when the armature is in a retracted position, a stop-catch electrically insulated from the first said stop-catch and adapted to stop the escape-wheel and to open the local battery through the relay when the armature-lever is in an attracted position, the said cut-out mechanism being operated by means of a current established in the said supplemental circuit on closing the same at any one or more stations in the system, substantially as specified.

9. In a series of step-by-step and restoring mechanisms in which the normal current synchronously operates the restoring mechanisms, and a pulsating diminished current synchronously operates the step-by-step mechanisms, means to interrupt the energizing-current of the system subsequent to the restoring of the mechanisms therein, consisting of a supplemental circuit containing electromagnets and means to energize the same, an armature-lever energized by the said electromagnets and adapted to release and stop an impelled escape-wheel, a stop-catch carried by the said armature-lever and adapted to stop the said escape-wheel and close a local battery through a relay when the said armature is in a retracted position, said relay adapted to interrupt the energizing-current of the system on being itself energized, a stop-catch electrically insulated from the first said stop-catch and adapted to stop the escape-wheel and open the local battery through the relay when the armature-lever is in an attracted position, substantially as described.

10. The combination in a selector battery-cut-out system, of a line-circuit connecting a series of step-by-step and restoring mechanisms at a series of stations respectively, an energizing-battery located in said circuit, a series of contact-cranks and a series of switches located at said stations by means of which the circuit may be opened and closed and the current pulsated through the mechanisms, means to diminish the normal current in the line-circuit when it is desired to step the mechanisms, and restored, when it is desired to restore the mechanisms, means located in a supplemental circuit operating to place the said energizing-battery in the line-circuit at the instant it is desired to step the mechanisms, and cut out the said energizing-battery subsequent to the restoring of the mechanisms therein, the step-by-step and restoring mechanisms comprising the ratchet-wheel, levers and pawls to rotate the contact-disk, the contact-disk and contact-screw to close the supplemental or ringing circuit at a predetermined position of rotation of said series of mechanisms, the bifurcated lever operated by the normal current to disengage the pawls, and the segment-gear to return the ratchet-wheel and contact-disk to normal position on operating the restoring mechanism to reset the system.

11. The combination in a selector battery-cut-out system, of a line-circuit connecting a series of step-by-step and restoring mechanisms at a series of stations respectively, an energizing-battery located in said circuit, a series of contact-cranks and a series of switches located at said stations by means of which the circuit may be opened and closed and the current pulsated through the mechanisms, means to diminish the normal current in the line-circuit when it is desired to step the mechanisms, and restored, when it is desired to restore the mechanisms, means located in a supplemental circuit operating to place the said energizing-battery in the line-circuit at the instant it is desired to step the mechanisms, and cut out the said energizing-battery subsequent to the restoring of the mechanisms therein, the step-by-step and restoring mechanisms comprising the ratchet-wheel, levers and pawls to rotate the contact-disk, the contact-disk and contact-screw to close the supplemental or ringing circuit at a predetermined position of rotation of said series of mechanisms, the bifurcated lever operated by the normal current to disengage the pawls, and the segment-gear to return the ratchet-wheel and contact-disk to normal position on operating the restoring mechanisms to reset the system, the cut-out mechanism comprising the relay to interrupt the energizing-battery, an impelled and retarded escape-wheel carrying a contact stop-pin, an armature-lever adapted to release and stop the escape-wheel in either the attracted or retracted position of the said armature-lever, a stop-catch carried by the said armature-lever and adapted to stop the escape-wheel and close the said relay when the armature-lever is in a retracted position, a stop-catch electrically insulated from the first said stop-catch and adapted to stop the escape-wheel and open the relay when the armature-lever is in an attracted position, substantially as herein set forth.

THOMAS C. DRAKE.

Witnesses:
JOHN D. ERWIN,
GEO. M. SCOTT.